(12) United States Patent
Wuidart et al.

(10) Patent No.: US 6,784,785 B1
(45) Date of Patent: Aug. 31, 2004

(54) DUPLEX TRANSMISSION IN AN ELECTROMAGNETIC TRANSPONDER SYSTEM

(75) Inventors: Luc Wuidart, Pourrieres (FR); Michel Bardouillet, Rousset (FR); Jean-Pierre Enguent, Saint Savournin (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/543,824

(22) Filed: Apr. 5, 2000

(30) Foreign Application Priority Data

Apr. 7, 1999 (FR) .......................................... 99 04549

(51) Int. Cl.[7] .............................................. H04Q 7/00
(52) U.S. Cl. ................... 340/10.1; 340/10.2; 340/10.5; 340/10.51; 340/825.7; 340/825.77; 342/30
(58) Field of Search ............................... 340/10.1, 10.2, 340/10.5, 825.7, 825.72, 10.51, 825.69; 342/30, 43; 370/329, 332

(56) References Cited

U.S. PATENT DOCUMENTS

| | | | |
|---|---|---|---|
| 2,411,555 A | 11/1946 | Rogers | |
| 3,618,089 A | 11/1971 | Moran, Jr. et al. | |
| 4,068,232 A | 1/1978 | Meyers et al. | |
| 4,209,783 A | 6/1980 | Ohyama et al. | |
| 4,278,977 A | 7/1981 | Nossen | |
| 4,408,185 A | 10/1983 | Rasmussen | |
| 4,593,412 A | 6/1986 | Jacob | |
| 4,656,472 A | 4/1987 | Walton | |
| 4,660,192 A | * 4/1987 | Pomatto, Sr. .................. | 370/11 |
| 4,706,050 A | 11/1987 | Andrews | |
| 4,782,308 A | 11/1988 | Trobec et al. | |
| 4,802,080 A | 1/1989 | Bossi et al. | |
| 4,814,595 A | 3/1989 | Gilboa | |
| 4,827,266 A | 5/1989 | Sato et al. | |
| 4,928,108 A | 5/1990 | Kropielnicki et al. | |
| 4,963,887 A | * 10/1990 | Kawashima et al. .......... | 342/44 |
| 5,013,898 A | 5/1991 | Glasspool | |
| 5,055,853 A | 10/1991 | Garnier | |
| 5,099,227 A | 3/1992 | Geiszler et al. | |
| 5,126,749 A | 6/1992 | Kaltner | |
| 5,142,292 A | 8/1992 | Chang | |
| 5,202,644 A | * 4/1993 | Brady ......................... | 329/313 |

(List continued on next page.)

FOREIGN PATENT DOCUMENTS

| DE | 28 35 549 A1 | 3/1979 |
|---|---|---|
| DE | 44 44 984 | 12/1994 |

(List continued on next page.)

OTHER PUBLICATIONS

French Search Report from French Patent Application No. 99 09563, filed Jul. 20, 1999.

(List continued on next page.)

*Primary Examiner*—Michael Horabik
*Assistant Examiner*—Vernal Brown
(74) *Attorney, Agent, or Firm*—Lisa K. Jorgenson; James H. Morris; Wolf, Greenfield & Sacks, P.C.

(57) ABSTRACT

A method of transmission between two elements chosen from a terminal and a transponder, each element including an oscillating circuit, a modulator and a demodulator, including simultaneously performing a transmission in amplitude modulation of a signal transmitted from a first to a second element and a transmission of a signal from the second to the first element adapted to being submitted to a phase demodulation in the latter, and wherein the amplitude modulation rate is smaller than 100%.

7 Claims, 5 Drawing Sheets

U.S. PATENT DOCUMENTS

| | | | |
|---|---|---|---|
| 5,214,409 A | 5/1993 | Beigel | |
| 5,305,008 A | 4/1994 | Turner et al. | |
| 5,324,315 A | 6/1994 | Grevious | |
| 5,452,344 A | 9/1995 | Larson | |
| 5,493,267 A | 2/1996 | Ahlse et al. | |
| 5,504,485 A | 4/1996 | Landt et al. | |
| 5,521,602 A | 5/1996 | Carroll et al. | 342/50 |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A | 12/1997 | Murdoch | |
| 5,703,573 A | 12/1997 | Fujimoto et al. | |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A * | 2/2000 | Preishuberpflugl et al. | 340/10.4 |
| 6,034,640 A | 3/2000 | Oida et al. | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A | 8/2000 | Frary | |
| 6,137,411 A | 10/2000 | Tyren | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,307,468 B1 | 10/2001 | Ward, Jr. | |
| 6,307,517 B1 | 10/2001 | Lee | |
| 6,393,045 B1 | 5/2002 | Belcher et al. | |
| 6,424,820 B1 | 7/2002 | Burdick et al. | |
| 6,441,804 B1 * | 8/2002 | Hsien | 345/158 |
| 6,446,049 B1 | 9/2002 | Janning et al. | |
| 6,491,230 B1 | 12/2002 | Dubost et al. | |

FOREIGN PATENT DOCUMENTS

| | | | | |
|---|---|---|---|---|
| DE | 195 46 928 | | 6/1997 | |
| DE | 196 21 076 | | 11/1997 | |
| DE | 196 32 282 A1 | | 2/1998 | |
| EP | 0 038 877 | | 11/1981 | |
| EP | 0 369 622 | | 5/1990 | |
| EP | 0 568 067 A | | 11/1993 | |
| EP | 0 579 332 A1 | | 1/1994 | |
| EP | 0 645 840 A | | 3/1995 | |
| EP | A-0 768 540 | | 4/1997 | G01S/13/02 |
| EP | 0768540 | * | 6/1997 | G01S/13/02 |
| EP | 0 857 981 A1 | | 8/1998 | |
| EP | 0 902 475 A | | 3/1999 | |
| FR | 2 114 026 | | 6/1972 | |
| FR | 2 746 200 | | 9/1997 | |
| FR | 2 757 952 | | 7/1998 | |
| GB | 2 298 553 A | | 9/1996 | |
| GB | 2 321 726 A1 | | 8/1998 | |
| JP | 407245946 A | | 9/1995 | |
| JP | 4072495946 A | | 9/1995 | |
| JP | 10-145267 | | 5/1998 | |
| JP | 10-203066 | | 8/1998 | |
| WO | WO 93/17482 | | 9/1993 | |
| WO | WO 98/20363 | | 5/1998 | |
| WO | WO 99/33017 | | 7/1999 | |
| WO | WO 99/43096 | | 8/1999 | |

OTHER PUBLICATIONS

French Search Report Patent Application Ser. No. 98 08025, filed Jun. 22, 1998.

French Search Report from French Application No. 99 04547, filed Apr. 7, 1999.

French Search Report from French Patent Application No. 99 04546, filed Apr. 7, 1999.

French Search Report from Patent Application No. 98 08024, filed Jun. 22, 1998.

French Search Report from French Patent Application No. 99 04548, filed Apr. 7, 1999.

French Search Report from Patent Application No. 99 04544, filed Apr. 7, 1999.

French Search Report from French Patent Application NO. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application 99 04549, filed Apr. 7, 1999.

* cited by examiner

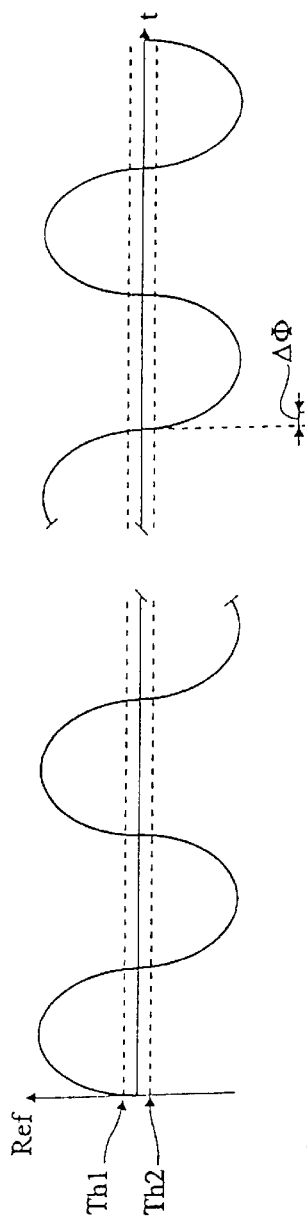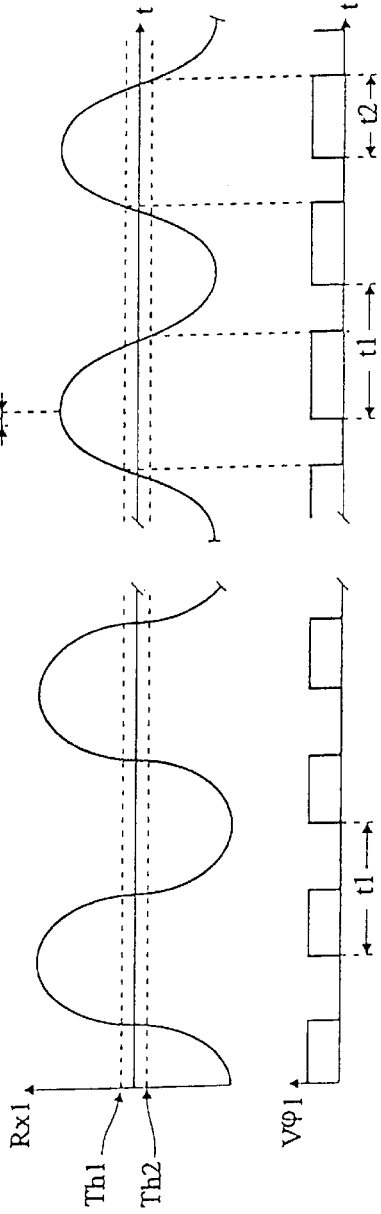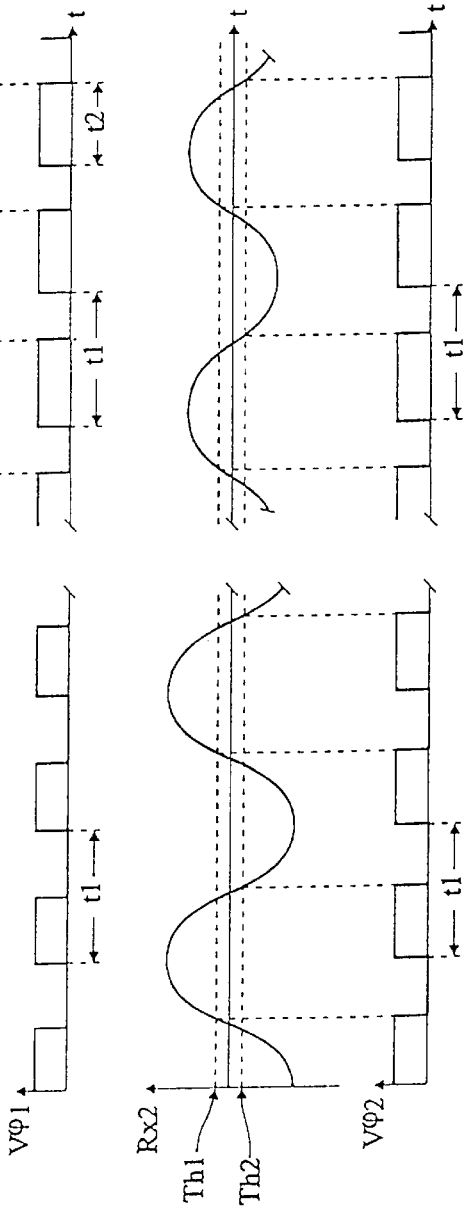

DUPLEX TRANSMISSION IN AN ELECTROMAGNETIC TRANSPONDER SYSTEM

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read/write terminal. The present invention more specifically relates to transponders having no independent power supply. Such transponders extract the power supply required by the electronic circuits included therein from the high frequency field radiated by an antenna of the read/write terminal. The present invention applies to such transponders, be they read only transponders, that is, adapted to operating with a terminal only reading the transponder data, or read/write transponders, which contain data that can be modified by the terminal.

2. Discussion of the Related Art

Electromagnetic transponders are based on the use of oscillating circuits including a winding forming an antenna, on the transponder side and on the read/write terminal side. These circuits are intended to be coupled by a close magnetic field when the transponder enters the field of the read/write terminal. The range of a transponder system, that is, the maximum distance from the terminal at which a transponder is activated (awake) depends, especially, on the size of the transponder's antenna, on the excitation frequency of the coil of the oscillating circuit generating the magnetic field, on the intensity of this excitation, and on the transponder power consumption.

FIG. 1 very schematically shows, in a functional way, a conventional example of a data exchange system between a read/write terminal 1 (STA) and a transponder 10 (CAR).

Generally, terminal 1 is essentially formed of an oscillating circuit formed of an inductance L1 in series with a capacitor C1 and a resistor R1, between an output terminal 2p of an amplifier or antenna coupler 3 (DRIV) and a terminal 2m at a reference potential (generally, the ground). Amplifier 3 receives a high-frequency transmission signal Tx, provided by a modulator 4 (MOD). The modulator receives a reference frequency, for example, from a quartz oscillator 5 and, if necessary, a data signal to be transmitted. In the absence of a data transmission from terminal 1 to transponder 10, signal Tx is used as a power source only, to activate the transponder if said transponder enters the field. The data to be transmitted come from an electronic system, generally digital, for example, a microprocessor 6 ($\mu$P).

The connection node of capacitor C1 and inductance L1 forms, in the example shown in FIG. 1, a terminal for sampling a data signal Rx, received from a transponder 10 and intended for a demodulator 7 (DEM). An output of the demodulator communicates (if necessary via a decoder (DEC) 8) the data received from transponder 10 to microprocessor 6 of read/write terminal 1. Demodulator 7 receives, generally from oscillator 5, a clock or reference signal for a phase demodulation. The demodulation may be performed from a signal sampled between capacitor C1 and resistor R1 and not across inductance L1. Microprocessor 6 communicates (bus EXT) with different input/output (keyboard, screen, means of transmission to a provider, etc.) and/or processing circuits. The circuits of the read/write terminal draw the energy necessary for their operation from a supply circuit 9 (ALIM), connected, for example, to the electric supply system.

On the side of transponder 10, an inductance L2, in parallel with a capacitor C2, forms a parallel oscillating circuit (called a reception resonant circuit) intended for capturing the field generated by series oscillating circuit L1C1 of terminal 1. The resonant circuit (L2, C2) of transponder 10 is tuned on the frequency of the oscillating circuit (L1C1) of terminal 1.

Terminals 11, 12, of resonant circuit L2C2, which correspond to the terminals of capacitor C2, are connected to two A.C. input terminals of a rectifying bridge 13 formed, for example, of four diodes D1, D2, D3, D4. In the representation of FIG. 1, the anode of diode D1 and the cathode of diode D3 are connected to terminal 11. The anode of diode D2 and the cathode of diode D4 are connected to terminal 12. The cathodes of diodes D1 and D2 form a positive rectified output terminal 14. The anodes of diodes D3 and D4 form a reference terminal 15 of the rectified voltage. A capacitor Ca is connected to rectified output terminals 14, 15 of bridge 13 to store power and smooth the rectified voltage provided by the bridge. It should be noted that the diode bridge may be replaced with a single-halfwave rectifying assembly.

When transponder 10 is in the field of terminal 1, a high frequency voltage is generated across resonant circuit L2C2. This voltage, rectified by bridge 13 and smoothed by capacitor Ca, provides a supply voltage to electronic circuits of the transponder via a voltage regulator 16 (REG). These circuits generally include, essentially, a microprocessor ($\mu$P) 17 (associated with a memory not shown), a demodulator 18 (DEM) of the signals that may be received from terminal 1, and a modulator 19 (MOD) to transmit information to terminal 1. The transponder is generally synchronized by means of a clock (CLK) extracted, by a block 20, from the high-frequency signal recovered across capacitor C2 before rectification. Most often, all the electronic circuits of transponder 10 are integrated in a same chip.

To transmit the data from transponder 10 to unit 1, modulator 19 controls a stage of modulation (back modulation) of resonant circuit L2C2. This modulation stage is generally formed of an electronic switch (for example, a transistor T) and of a resistor R, in series between terminals 14 and 15. Transistor T is controlled at a so-called subcarrier frequency (for example, 847.5 kHz), much smaller (generally with a ratio of at least 10) than the frequency of the excitation signal of the oscillating circuit of terminal 1 (for example, 13.56 MHz). When switch T is closed, the oscillating circuit of the transponder is submitted to an additional damping as compared to the load formed of circuits 16, 17, 18, 19 and 20, so that the transponder draws a greater amount of power from the high frequency field. On the side of terminal 1, amplifier 3 maintains the amplitude of the high-frequency excitation signal constant. Accordingly, the power variation of the transponder translates as an amplitude and phase variation of the current in antenna L1. This variation is detected by demodulator 7 of terminal 1, which is either a phase demodulator or an amplitude demodulator. For example, in the case of a phase demodulation, the demodulator detects, in the half-periods of the sub-carrier where switch T of the transponder is closed, a slight phase shift (a few degrees, or even less than one degree) of the carrier of signal Rx with respect to the reference signal. The output of demodulator 7 (generally the output of a band-pass filter centered on the sub-carrier frequency) then provides an image signal of the control signal of switch T that can be decoded (by decoder 8 or directly by microprocessor 6) to restore the binary data.

FIGS. 2A and 2B illustrate a conventional example of data transmission from terminal 1 to a transponder 10. FIG. 2A shows an example of shape of the excitation signal of antenna L1 for a transmission of a code 1011. The modulation currently used is an amplitude modulation with a 106-kbit/s rate (one bit is transmitted in approximately 9.5 μs) much smaller than the frequency (for example, 13.56 MHz) of the carrier coming from oscillator 5 (period of approximately 74 ns). The amplitude modulation is performed either in all or nothing or with a modulation ratio (defined as being the difference of the peak amplitudes between the two states (0 and 1), divided by the sum of these amplitudes) smaller than one hundred percent (100%) due to the need for supply of transponder 10.

In the example of FIGS. 2A and 2B, the carrier at 13.56 MHz is modulated in amplitude, with a 106-kbit/s rate, with a modulation ratio of, for example, 10%. Then, as will be better understood by comparing the time scales of FIGS. 2A and 2B, the transmission of a bit from terminal 1 to transponder 10 requires, with such a rate, sixty-four halfwaves of the carrier. FIG. 2B shows eight halfwaves of the carrier at 13.56 MHz.

FIGS. 3A and 3B illustrate a conventional example of a data transmission from transponder 10 to terminal 1. FIG. 3A illustrates an example of the shape of the control signal of transistor T, provided by modulator 19, for a transmission of a code 0110. On the transponder side, the back modulation is generally of resistive type with a carrier (called a sub-carrier) of, for example, 847.5 kHz (period of approximately 1.18 μs). The back modulation is, for example, based on a BPSK-type (binary phase-shift keying) coding at a rate on the order of 106 kbits/s, much smaller than the sub-carrier frequency.

FIG. 3B illustrates the variations of the sub-carrier during a time interval of same length as in FIG. 2B (eight halfwaves of the carrier at 13.56 MHz), that is, of substantially 1.18 μs, corresponding to one sub-carrier period.

It should be noted that, whatever the type of modulation or back modulation used (for example, amplitude, phase, frequency) and whatever the type of data coding (NRZ, NRZI, Manchester, ASK, BPSK, etc.), this modulation or back modulation is performed digitally, by jumping between two binary levels.

It should also be noted that the terminal does not transmit data when it receives some from a transponder, the data transmission occurring alternately in one direction, then in the other (half-duplex).

Indeed, the previously-described conventional transmission method does not enable simultaneous transmission from the transponder to the terminal and from the terminal to the transponder. Among the problems raised by such a bidirectional method, there is, in particular, the risk for the transmission from one of the system elements—terminal or transponder—to the other—transponder or terminal—to disturb the decoding of the data received from the other element.

SUMMARY OF THE INVENTION

The present invention aims at providing a novel transmission method that is bidirectional (duplex method).

The present invention also aims at providing a read/write terminal useable to implement a conventional method (half-duplex) as well as a bidirectional method (duplex).

The present invention also aims at providing a transponder adapted to implementing a conventional transmission method as well as a bidirectional method.

To achieve these and other objects, the present invention provides a method of transmission between two elements chosen from a terminal and a transponder, each element including an oscillating circuit, a modulation means and a demodulation means, including the steps of simultaneously performing a transmission in amplitude modulation of a signal transmitted from a first to a second element and a transmission of a signal from the second to the first element adapted to being submitted to a phase demodulation in the latter, and wherein the amplitude modulation ratio is smaller than 100%.

According to an embodiment of the present invention, the modulation ratio is smaller than 50%.

According to an embodiment of the present invention, the method includes, on the side of the first element, clipping the received signal before demodulation.

According to an embodiment of the present invention, the method includes, on the side of the first element, clipping a reference signal of the phase demodulation.

According to an embodiment of the present invention, the first element is a transponder, the second element being a terminal.

According to an embodiment of the present invention, the first element is a terminal, the second element being a transponder.

The present invention also provides a terminal including a means for comparing transmitted and received signals clipped by respective clipping means.

According to an embodiment of the present invention, the terminal includes means for regulating the signal phase in its oscillating circuit with respect to a reference value, the response time of the phase regulation being shorter than the amplitude modulation period and longer than the period of the signal that will have to undergo a phase demodulation.

The present invention also provides a transponder including an amplitude demodulation means sized according to the attenuation introduced by a back modulation means.

According to an embodiment of the present invention, the transponder includes an amplitude demodulation means, the result of which is only taken into account during one state out of two of an output signal of a back modulation means.

The foregoing objects, features and advantages of the present invention, will be discussed in detail in the following non-limiting description of specific embodiments in connection with the accompanying drawings.

BRIEF DESCRIPTION OF THE DRAWINGS

FIGS. 4A to 4E are timing diagrams illustrating the problem raised by the phase demodulation in a duplex method;

DETAILED DESCRIPTION

Figure 1:
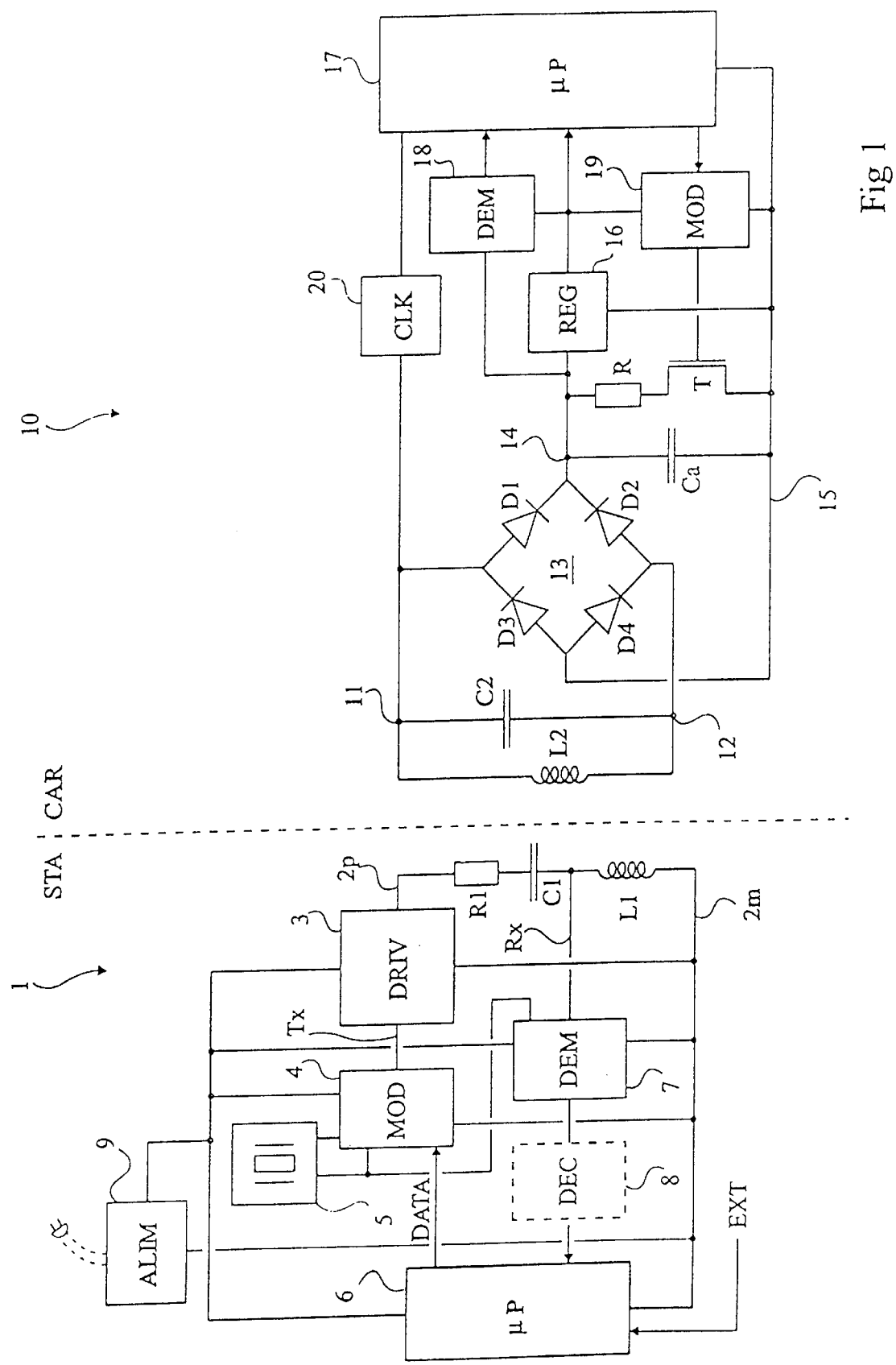
FIG. 1 shows a conventional electromagnetic transponder associated with a conventional terminal.

The same elements have been referred to with the same references in the different drawings, and the drawings have been drawn out of scale. For clarity, only those elements necessary to the understanding of the present invention have been shown in the drawings and will be described hereafter. In particular, the structure of a transponder and the structure of the digital data processing elements, on the read terminal side, have not been detailed. Further, the timing diagrams of FIGS. 2A to 4E are not drawn to scale.

The method of the present invention applies to transponder systems. More specifically, the present invention applies to such systems in which the transmissions from a first element—terminal or transponder—to a second element—transponder or terminal—are performed according to a first type of—phase or amplitude—modulation and in which the demodulations of the transmissions from the second element to the first one are performed according to a second type of modulation distinct from the first one. Further, the amplitude modulation will be a modulation of a ratio smaller than 100%.

The present invention advantageously takes advantage of the difference between the first and second types of modulation to enable simultaneous transmissions.

One of the problems raised by the implementation of a bidirectional method is the fact that each element (transponder or terminal) disturbs by its own transmission the decoding of the signal received from the other element (terminal or transponder).

It will be assumed hereafter, as a non-limiting example, similarly to what has been previously discussed in relation with FIGS. 2A to 3B, that the transmissions from a terminal to a transponder are performed by amplitude modulation of a carrier, and that the transmissions from a transponder to a terminal are performed by coding by phase shift of a sub-carrier and are detected based on a phase demodulation of the carrier.

As an example, the case previously described in relation with FIG. 1 in which the back modulation is performed by means of a resistive means is considered.

Thus, the transponder draws, as previously discussed, from the carrier modulated by the terminal, the power necessary to its operation, especially, on the one hand, the power necessary for the control of switch T by microprocessor µP 17 and, on the other hand, by performing a simultaneous transmission, the power dissipated during the closed periods of switch T by the addition of resistor R in the circuit. Such a drawing can result in wrong readings by the transponder, especially during closed periods of switch T. Indeed, the corresponding load increase of the oscillating circuit (L2C2) of the transponder with respect to the oscillating circuit (L1C1) of the terminal causes an attenuation of the received signal that alters the demodulation. Indeed, assuming that from an initial time t0, the transponder starts receiving sequence 1011 of the example of FIG. 2A, and assuming that during the transmission of the first bit (1), the transponder causes the turning-on of switch T, an attenuation of the first received bit (1) can be observed. Such an attenuation risks altering the discrimination between the level of such a signal corresponding to an attenuated datum "1" and the subsequent signal voluntarily attenuated in amplitude at the terminal level to transmit datum "0".

On the terminal side, a similar phenomenon of possible perversion of the decoding of the signal received from the transponder by the signal that it itself transmits can be observed. It should be reminded that the demodulation is, in this example, a phase demodulation, performed by demodulator 7 by comparing the received signal Rx with a reference signal Ref provided, preferably, by oscillator 5.

More specifically, demodulator 7 performs the demodulation by generating a pulse-width modulation signal (PWM) of a frequency that is double the reference signal and the duty ratio of which depends on the phase shift. It should be noted that the reference signal and the received signal (to be demodulated) are significantly attenuated at the input of the demodulator to be compatible with low voltage logic circuits. It should also be noted that the demodulator does not aim at measuring the phase shift—its absolute value—but only at detecting the existence of a phase variation to restore a signal at the sub-carrier frequency that is then decoded. Demodulator 7 is for example an X-OR logic gate.

FIGS. 4A to 4E illustrate an embodiment of a demodulation of data received from the transponder by the terminal, for example, by means of an X-OR gate. The shapes of the different signals are shown in the absence—to the left of the drawings—and in the presence—to the right of the drawings—of additional resistive load R in the transponder circuit. In other words, the left-hand portions of FIGS. 4A to 4E correspond to open periods of switch T and their right-hand portions correspond to closed periods of switch T.

FIG. 4A shows an example of a reference signal Ref, preferably, sinusoidal, at a 13.56-MHz frequency, sampled at the level of oscillator 5, and forming a first input of the X-OR gate. Of course, such a signal is not altered by the control of the resistive back modulation means. The left-hand and right-hand portions of FIG. 4A are thus identical.

FIG. 4B illustrates a first example of a signal Rx1 received from the transponder by the terminal. Signal Rx1 is a signal back modulated by the transponder from the carrier, not attenuated in amplitude. At the input of the X-OR gate, as illustrated in FIG. 4B, signal Rx1 is phase-shifted by 90° with respect to reference signal Ref by the sizing of the circuit components, to obtain a duty ratio (ratio of the high state period to the signal period) of fifty percent when switch T is open.

When switch T is closed, as will be better understood by comparing the left-hand and right-hand portions of FIG. 4B, a phase shift Δϕ corresponding to the phase modulation introduced in the sub-carrier by the back modulation means adds to the basic 90° phase shift of signal Rx1 with respect to signal Ref. Phase shift Δϕ lasts for at least one half sub-carrier period. It should be noted that during closed periods of switch T, signal Rx1 is further attenuated by the additional resistive load introduced.

It should be noted that due to this attenuation, and since its period remains constant, signal Rx1 exhibits different slopes at the zero crossing according to whether switch T is open or closed. It should be reminded that due to the very high levels, between 10 and 30 volts, incompatible with maximum 5-volt levels at the input of a logic gate, signals Ref and Rx1 are attenuated. The effects of the slope are then enhanced.

FIG. 4C illustrates an example of an output signal Vϕ1 of the X-OR gate. Signal Vϕ1 has been plotted based on the truth table of such a gate, and by comparing signals Ref and Rx1 such as illustrated in FIGS. 4A and 4B.

When switch T is open, to the left of the drawing, signal Vϕ1 is a pulse-width modulation signal of a 50% duty ratio. As clearly appears from the comparison of FIGS. 4A to 4C, the rising edges of signal Vϕ1 are controlled by the zero crossing of signal Ref and the falling edges are controlled by the zero crossing of signal Rx1. Two rising edges are thus separated by a time interval t1 corresponding to one half-period (approximately 37 ns) of the carrier provided by oscillator 5. Time interval t2 separating a rising edge from a falling edge then corresponds to the phase shift between two zero crossings of signals Ref and Rx1, that is, 90°, that is, one quarter of a period (approximately 13.5 ns).

When switch T is closed, to the right of the drawing, signal Vϕ1 keeps the previously-described general shape. It has rising edges at the zero crossings of signal Ref and falling edges at the zero crossing of signal Rx1. However, due to phase shift Δϕ, the duty ratio of the signal is modified.

The attenuation effect of signal Rx1 due to the introduction of the resistive load also intervenes in this modification of the duty ratio. Indeed, the X-OR gate has a switching threshold. In practice, like may discriminators, it even has a detection hysteresis and, accordingly, upper and lower thresholds Th1 and Th2 shown in dotted lines in FIGS. 4A, 4B and 4D. Only after the passing beyond threshold Th2 will the X-OR gate detect a decreasing zero crossing of signal Rx1, and only after the passing beyond threshold Th1 will the same gate detect an increasing zero crossing of signal Rx1. The periods of signals Ref and Rx1 being the same, such a hysteresis effect is identical on each of them in the absence of an attenuation. However, since in practice, signal Rx1 is attenuated when switch T is closed, as illustrated in the right-hand portion of FIG. 4B, thresholds Th1 and Th2 must take account of this attenuation to enable the detection in a conventional operation. Indeed, signal Rx1 will then cross thresholds Th1 and Th2 as it increases and decreases, respectively, later than when switch T is open.

Such a hysteresis phenomenon can result in wrong phase shift detections (that is, to the reading of false data) as will be explained hereafter in relation with FIGS. 4D and 4E.

FIG. 4D illustrates a second example of a signal Rx2 received by the terminal. Signal Rx2 is a signal back modulated from an attenuated carrier. It should indeed be reminded that the terminal, to transmit data to the transponder, performs an amplitude modulation with a modulation ratio under 100%. Then, as illustrated in FIG. 4D, even when transistor T is off, to the left of the drawings, signal Rx2 has deformed curves with respect to the reference signal (FIG. 4A). This effect is further enhanced, as illustrated in the right-hand portion of FIG. 4D when switch T is closed under the additional attenuation effect resulting from the resistive load. As previously, when switch T is open, signal Rx2 is phase-shifted by 90° only with respect to the reference signal and when switch T is closed, an additional phase shift, which is an image of the back modulation, appears.

FIG. 4E illustrates output signal Vϕ2 of the discriminator obtained by combining the signals of FIGS. 4A and 4D. The period of the obtained pulse train, that is, the interval separating two rising edges or two falling edges still is half-period t1 of the reference signal. However, the duty ratio of the signal is different than 50% according to whether switch T is closed or open.

When switch T is open, given the enhancing effect at the discriminator input of the amplitude attenuation due to the data transmission from the terminal to the transponder, signal Rx2 now transits through thresholds Th1 and Th2, respectively, as it increases and decreases, while being delayed with respect to the same non-attenuated signal such as illustrated in the left-hand portion of FIG. 4B. The discriminator thus performs a delayed detection of the zero crossing of signal Rx2, thus generating an output signal Vϕ2 with a duty ratio different than 50%.

When switch T is closed—to the right of the drawing—the duty ratio of output signal Vϕ2 is further modified due to the phase shift and to the additional attenuation introduced by the resistive load.

The discriminator is incapable of distinguishing the duty ratio modification, described in relation with FIG. 4E, to the left, only corresponding to an amplitude attenuation of the received signal from a back modulated received signal such as described in relation with the right-hand portions of FIGS. 4B or 4D.

Further, all these phenomena are increased by the fact that thresholds Th1 and Th2 are not necessarily symmetrical.

It should be noted that it has been previously assumed that the reference signal is directly sampled at the level of oscillator 5. However, if the signal is sampled after the modulator, that is, if an image of signal Tx transmitted from the terminal is considered, wrong detections may also result from the fact that this transponder back modulates a signal that is not attenuated in amplitude at the time when the terminal attenuates its own amplitude to transmit data to the transponder. In this case, the discriminator will detect that the received signal transits through zero in advance with respect to the reference signal and will accordingly modify its output signal.

Figure 5:
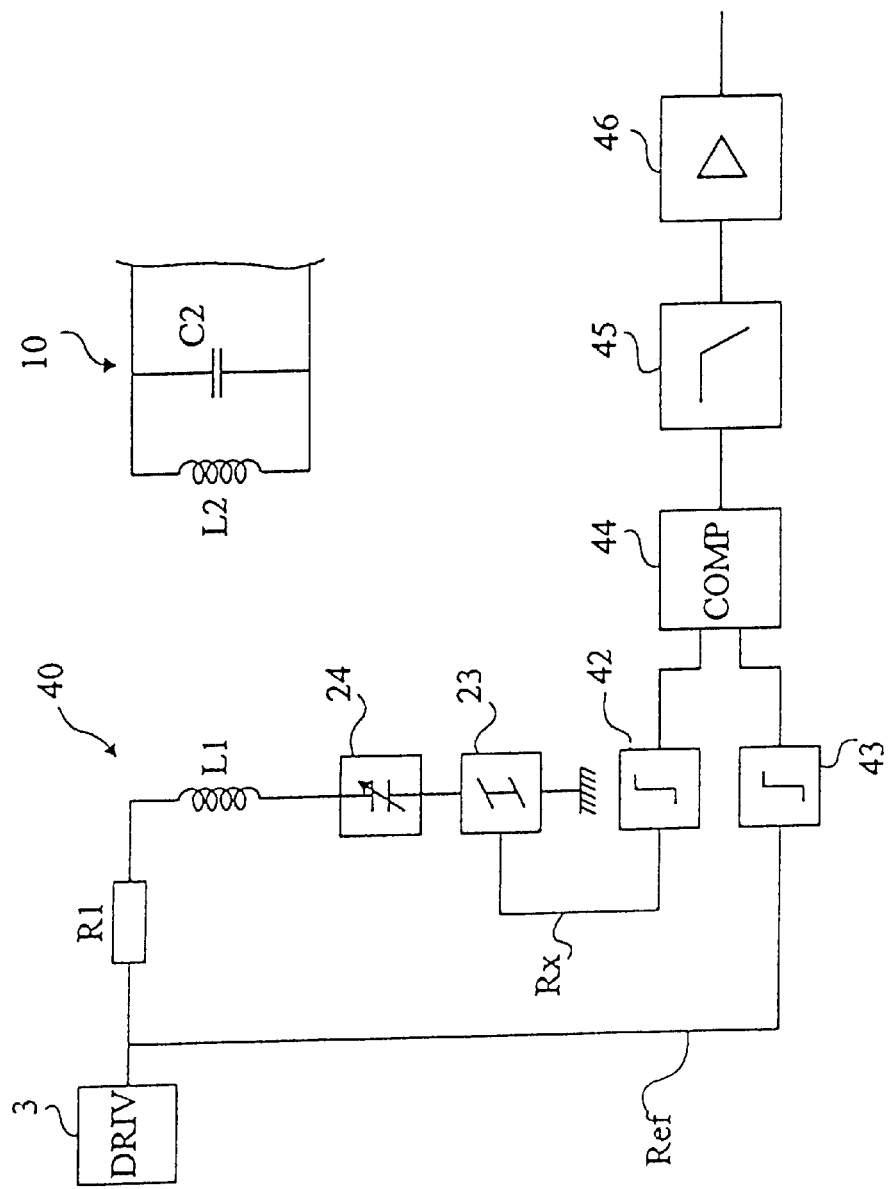
FIG. 5 is a block diagram illustrating the principle of a terminal according to the present invention.

To overcome these combined attenuation-hysteresis effects at the discriminator level, the present invention provides the solution described hereafter in relation with FIG. 5.

FIG. 5 partially illustrates, in the form of block diagrams, a portion of a terminal 40 according to the present invention, in cooperation with a transponder 10. Terminal 40 according to the present invention is organized, as previously, around a resonant circuit formed of a winding L1 and of a capacitive element 24. The received signal is sampled at the output of circuit L1, 24 by means of a circuit 23 (for example, an intensity transformer). The signal Rx thus obtained is sent to the input of a first clipping circuit 42. A second clipping circuit 43 receives a reference signal (in terms of phase shift) corresponding, for example, to the signal provided by oscillator 5 or generator 3. The respective outputs of clipping circuits 42 and 43 are provided to a phase discriminator (or comparator) 44 (COMP), for example, an X-OR gate, the output of which gives back a signal Vϕ containing the information on the phase shift, and thus on the back modulation. The output of discriminator 44 is, conventionally, sent onto a low-pass filter 45 (or a band-pass filter centered on the sub-carrier frequency) followed by a level amplifier 46 that restores the demodulated data.

Signals Rx and Ref being clipped to the maximum input value of comparator 44, wrong detections linked to the attenuation of these signals are eliminated. Indeed, conversely to an attenuation, a clipping does not modify the shape of the curves, while satisfactorily limiting the input levels. The risks of wrong detections previously described in relation with FIGS. 4A to 4E are thus eliminated.

It should be noted that the smaller the amplitude modulation ratio, the closer the clipping thresholds can be to the maximum signal amplitude, and the more the phase demodulation is eased, on the terminal side. The modulation ratio must however be compatible with the performances of the amplitude demodulator, on the transponder side, and with its need for remote supply. In practice, this ratio will be limited to 50%, preferably to 10%.

It should also be noted that capacitive element 24 of the resonant circuit of terminal 40 is preferably variable. This element is then controlled by a system of servo-control of the phase and of the carrier. An extended operating range is then advantageously kept for the system.

Transponder 10 associated with terminal 40 has, as partially illustrated in FIG. 5, any known configuration, for example identical to a transponder 10 such as previously described in relation with FIG. 1.

However, precautions will be taken so that the resistive back modulation does not disturb the amplitude demodulation, by transponder 10, of the signal received from terminal 40.

According to a first example of embodiment, the value of resistance R of the back modulation means and the threshold of the transponder amplitude demodulator may be adapted to avoid that the attenuation linked to the introduction of resistance R on a non-attenuated carrier signal be mistaken for a signal attenuated by the terminal received while switch T is off. In this example, the influence of the resistive back modulation, that is, the attenuation caused by the periodic closing of switch T that puts resistor R in parallel with the demodulator (18, FIG. 1), must be smaller than the demodulation threshold to avoid being taken account of.

According to a second preferred embodiment, the microprocessor ($\mu$P 17, FIG. 1) is parameterized to only demodulate the received signal during open periods (or closed periods) of switch T. Thereby, additional risks of wrong detection linked, as discussed previously, to the attenuation caused by the inserting of resistor R in the circuit, are eliminated. It should be noted that such a synchronization can be easily implemented, given that the same microprocessor controls the demodulator of the received signal and the modulator of the transmitted signal. Such a control is made possible since the sub-carrier period is much shorter than the transmission duration of a bit from the terminal to the transponder.

An advantage of the present invention is that it enables implementing a simultaneous transmission method (duplex).

Another advantage of the present invention is that each of the elements—terminal or transponder—remains useable, if necessary, to implement a half-duplex method.

As an alternative, a back modulation by a capacitive means causing a slight detuning of the oscillating circuits by the modifying of capacitance C2 of resonant circuit L2C2 on the transponder side may be provided. An advantage of such an alternative is that it enables use of a detector that is less sensitive on the terminal side since the back modulation then does not come along with an attenuation and directly reflects on the phase.

Figure 6:
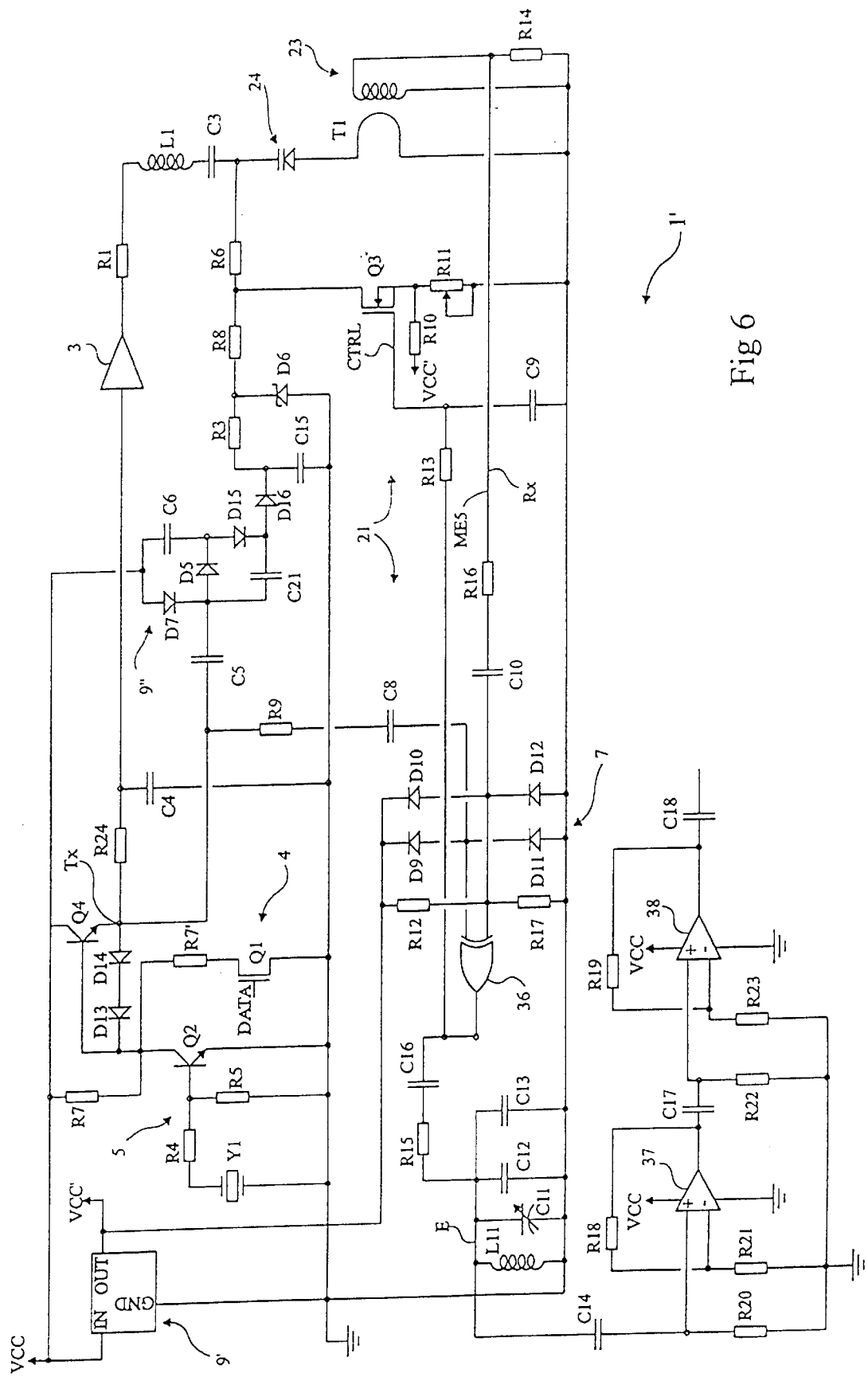
FIG. 6 is a detailed electric schematic diagram of an embodiment of a terminal according to the present invention.

FIG. 6 shows a detailed schematic diagram of an embodiment of a terminal 1' provided with clipping circuits according to the present invention. In FIG. 6, not all the elements constitutive of the terminal have been shown. In particular, the digital data processing circuit (microprocessor 6, FIG. 1) has not been shown. FIG. 6 further details an example of embodiment of the blocks illustrated in FIGS. 1 and 5. However, it being a practical embodiment, some of these blocks overlap or share common components with one or several other blocks.

In the example of FIG. 6, it is assumed that the entire circuit is supplied by means of a D.C. voltage Vcc (for example, 12 volts), the means for obtaining this voltage Vcc from the electric supply system or any other power source not being shown. A voltage regulator 9' is intended for providing a smaller voltage than voltage Vcc, that is, a voltage Vcc' (for example, on the order of 5 volts). An input terminal IN of regulator 9' is connected to voltage Vcc while an output terminal OUT provides voltage Vcc', ground GND of regulator 9' being connected to the ground line of the assembly.

Figure 2B:
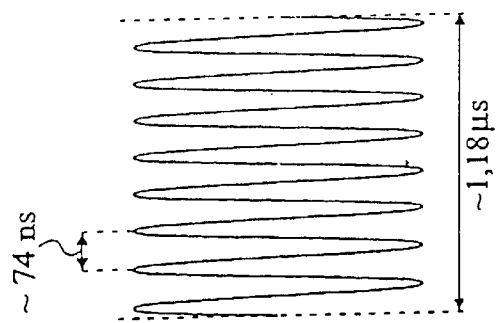
FIGS. 2A and 2B are timing diagrams illustrating an example of data transmission from a terminal to a transponder.
Figure 3B:
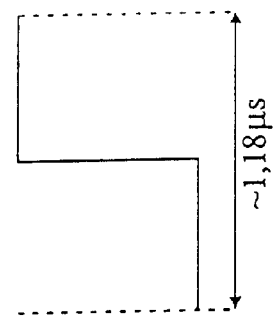
FIGS. 3A and 3B are timing diagrams illustrating the data transmission from a transponder to a terminal.
Figure 2A:
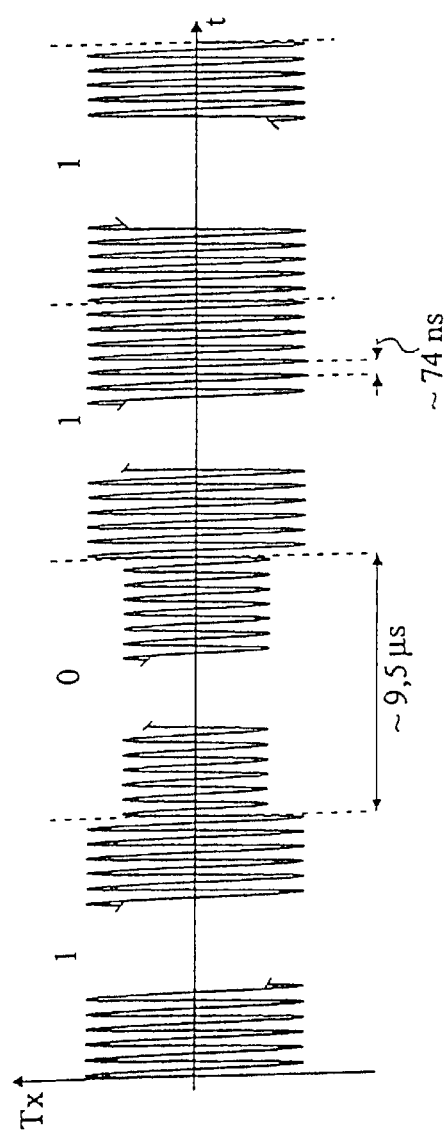
Figure 3A:
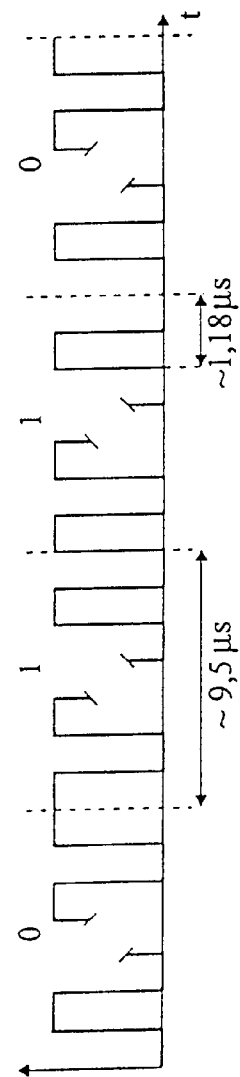

Oscillator 5 and modulator 4 shown in FIG. 1 are, in the example of FIG. 6, confounded in a time base circuit associated with a preamplifier, generally identified with references 4 and 5. This circuit is based on the use of an NPN-type bipolar transistor Q2, the emitter of which is connected to the ground and the collector of which is connected, via a resistor R7, to voltage Vcc. The base of transistor Q2 is connected, via a resistor R4, to a first terminal of a quartz oscillator Y1 (for example, at 13.56 MHz), the other terminal of which is grounded. A resistor R5 is connected between the base of transistor Q2 and the ground. An NPN-type bipolar transistor Q4 has its collector connected to voltage Vcc while its base is connected to the collector of transistor Q2 and, via two series-connected diodes D13 and D14, to the emitter of transistor Q4, the respective anodes of diodes D13 and D14 being on the emitter side of transistor Q4. This emitter forms the assembly node on which is present signal Tx to be amplified and forming, in the absence of any modulation, the carrier of remote supply of a transponder. The modulation circuit is formed of a resistor R7' in series with a transistor Q1 (for example, a MOS transistor) between the collector of transistor Q2 and the ground. The gate of transistor Q1 receives the digital signal of possible data to be transmitted. The ratio between resistors R7 and R7' determines the amplitude modulation ratio of the system. Thus, for a modulation ratio of 10% such as illustrated in FIG. 2, resistance R7 is ten times greater than resistance R7'.

The operation of a time base associated with a preamplifier such as illustrated in FIG. 6 is perfectly conventional. Signal Tx is sent, via a resistor R24, to the input of amplifier 3, a capacitor C4 being connected between this input and the ground. Optional circuit R24-C4 reduces or minimizes disturbances that would result from variations of the voltage of signal Tx that are too fast.

As illustrated in FIGS. 1 and 5, the output of amplifier 3 drives, via resistor R1, inductance L1 used as the terminal antenna.

In the example shown in FIG. 6, the capacitive element of the oscillating circuit is formed of a capacitor C3 of fixed value in series with a variable capacitance 24 formed, for example, of a diode. The value of the capacitance of diode 24 is determined by the voltage there across. This voltage is controlled by a MOS transistor Q3, the drain of which is connected, via a resistor R6, to the junction point of capacitor C3 and diode 24. The source of transistor Q3 is connected to the midpoint of a resistive dividing bridge between voltage Vcc' and the ground, this bridge being formed of a resistor R10 in series with a potentiometer R11. The gate of transistor Q3 receives phase regulation signal CTRL.

The potential of the drain of transistor Q3 is determined by an auxiliary supply circuit 9'', intended for generating a voltage (for example, on the order of 32 volts) greater than voltage Vcc. Circuit 9'' is, in the example shown in FIG. 6, formed of a zener diode D6, the anode of which is grounded and the cathode of which is connected to a first terminal of a resistor R8, the second terminal of which is connected to the drain of transistor Q3, and which forms therewith a voltage dividing bridge, the midpoint of which biases, via resistor R6, element 24. The cathode of zener diode D6 is also grounded, via a resistor R3 in series with a capacitor C15. The junction point of resistor R3 and capacitor C15 is connected to the cathode of a diode D16, the anode of which is connected, via a diode D15 in series with a capacitor C6, to voltage Vcc, the anode of diode D15 being connected to capacitor C6. The anode of diode D16 is also connected by a second inverted branch, that is, a branch formed of a capacitor C21 and of a diode D7 in series, to voltage Vcc, the cathode of diode D7 being here connected to capacitor C21. A diode D5 connects the cathode of diode D7 to the anode of diode D15, the anode of diode D5 being connected to the cathode of diode D7 and receiving, via a decoupling capacitor C5, signal Tx. Circuit 9" forms an auxiliary supply circuit controlled by respective edges of signal Tx, that is, storage capacitor C15 only receives power when a remote supply signal Tx is present.

Element 23 of current measurement in the oscillating circuit here is, for example, formed of an intensity transformer T1, the primary winding of which is connected between the anode of diode 24 and the ground. The secondary winding of transformer T1 has a first terminal directly connected to the ground and its other terminal rounded via a current-to-voltage converting resistor R14. The junction point of the second winding of transformer T1 with resistor R14 is connected, via a resistor R16 in series with a decoupling capacitor C10, to a first input of an X-OR logic gate 36 belonging to phase demodulator 7.

The second input of gate 36 receives, via a resistor R9 in series with a decoupling capacitor C8, signal Tx forming a reference signal. The first input of gate 36 is connected to the junction point of resistors R12 and R17 between terminal Vcc' and the ground and forms a dividing bridge for setting the common mode voltage (for example, to value Vcc'/2 if R12=R17) of the measured signal.

Gate 36 of demodulator 7 is associated with the clipping circuits (42, 43, FIG. 5). These circuits are respectively formed of two diodes D9, D10, D11, D12 associated two by two in series between voltage Vcc' and the ground. The junction point of diode D9 and diode D11 is connected to a second input of gate 36. The junction point of diode D10 and diode D12 is connected to the first input of gate 36 receiving the voltage measured by the intensity transformer. The clipping circuits enable avoiding wrong detections, as has been previously discussed, while avoiding that any input of gate 36 receives a voltage greater than 5 volts.

The output of gate 36 provides a square signal at twice the carrier frequency and the duty ratio of which depends on the phase shift between signals MES and Tx. This output is connected, via a resistor R13, to the gate of transistor Q3. Cell R13-C9 forms an integrator providing phase regulation control signal CTRL. This control results in varying the voltage across diode 24, and thus its junction capacitance. Cell R13-C9 integrates the output signal of gate 36 with respect to the carrier frequency and its time constant conditions (with cell R6-24) the response time of the phase regulation loop.

Advantage may be taken from the phase regulation loop to further improve or optimize the demodulation. For this purpose, the response time of the phase regulation loop is chosen to be fast as compared to the data transmission rate by amplitude modulation (106 kbits/s) and slow as compared to the sub-carrier period (847.5 kHz), and thus also as compared to the carrier period (13.56 MHz). Thus, the phase variations of the carrier and the phase shifts of the sub-carrier due to the back modulation are too fast to be taken into account by the regulation loop and can thus be decoded. However, parasitic phase variations due to the amplitude modulation that occur at the rate of the amplitude changes are taken into account and the regulation loop then restores the (static) phase shift between signal Rx and the reference signal at the base value (90°).

The improvement depends in this case on the phase loop gain. The higher this gain, the more parasitic phase shifts will be attenuated. It will however be ascertained to choose a gain that is compatible with the loop stability to avoid introducing an additional oscillation. For example, a gain on the order of 10, which enables attenuating disturbances due to the amplitude modulation by a factor 10, will be chosen.

The first input of gate 36 receives measurement signal MES that, in the example of FIG. 6, also forms the possible back modulation signal Rx received by the transponder. Thus, phase demodulator 7 also belongs to comparator 21 of FIG. 4 and thus belongs to the phase regulation system.

The output of gate 36 is, in the example of FIG. 6, also sent onto the input of a filter, for example, a band-pass filter centered on the back modulation frequency (for example, 847.5 kHz). This filter is formed of two capacitors C12 and C13 in parallel with a variable capacitor C11 and with an inductance L11 between the ground and a first terminal of a resistor R15, the other terminal of which is connected, via a decoupling capacitor C16, to the output of gate 36. The band-pass filter integrates the output signal of gate 36 and provides a signal that is an image of the control signal of transistor T, on the transponder side. The filter output (terminal E) is connected, via a decoupling capacitor C14, to a non-inverting input of an amplifier 37 supplied by voltage Vcc. This non-inverting input is also grounded by a resistor R20. The inverting input of amplifier 37 is connected to the junction point of a resistor R18 and a resistor R21 between the ground and the output of amplifier 37. This output of amplifier 37 is further connected, via a decoupling capacitor C17, to a non-inverting input of a similarly assembled amplifier 38, that is, the non-inverting input of which is grounded via a resistor R22, and the inverting input of which is connected to the junction point of resistors R19 and R23 between the ground and the output of amplifier 38. This output provides, via a capacitor C18, the data signal received at the sub-carrier frequency (847.5 kHz). This signal is then decoded (by decoder 8 or directly by microprocessor 6) to restore the data.

As an alternative, it should be noted that a low-pass filter having a cut-off frequency slightly greater than the sub-carrier frequency will also have the effect of integrating the output signal of gate 36 to restore an image of the back modulation. The use of a band-pass filter, however, also eliminates possible lower parasitic frequencies.

The respective values of RC cells R13-C9 and R6-24 are, preferably, chosen so that the time constant of the loop is large as compared to the rate of the back modulation (847.5 kHz) and small as compared to the displacement speed of a transponder in the terminal range. As an alternative, a value close to the sub-carrier frequency may be chosen. In this case, resistor R13 may participate in the demodulation band-pass filtering, terminal E being connected between resistor R13 and capacitor C9, resistor R15 and capacitor C16 being eliminated.

The two adjustable components of FIG. 6, that is, resistor R11 and capacitor C11 are respectively used to determine the chosen position for the phase and the centering of the band-pass filter of demodulator 7 on the 847.5-kHz frequency.

As a specific example of embodiment, a circuit such as illustrated in FIG. 6 may be formed with, for the resistors and capacitors, the following values:

R1=18 ohms/1 watt;
R3=R20=10 kiloohms;
R4=110 ohms;
R5=33 ohms;
R6=R8=100 kiloohms;
R7=R21=R23=470 ohms;

R9=R13=R16=1 kiloohm;
R10=R14=R15=R22=2.2 kiloohms;
R11 is a potentiometer of 5 kiloohms;
R12=R17=15 kiloohms;
R18=R19=4.7 kiloohms;
R24=220 ohms;
R7'=47 ohms;
C3=1 nanofarad;
C4=C5=C6=C14=C15=C16=C17=C18=C21=22 picofarads;
C8=C10=C13=100 picofarads;
C9=27 picofarads;
C12=220 picofarads;
C11 is a capacitance variable from 5 to 60 picofarads; and
L1=100 microhenry.

Of course, the present invention is likely to have various alterations, modifications, and improvements which will readily occur to those skilled in the art. In particular, the sizing of the components forming a terminal according to the present invention is within the abilities of those skilled in the art according to the application and to the desired range. It should be noted that, since oscillating signals are involved, the phase information of the oscillating circuit may be read on the current as well as on the voltage.

Moreover, other current detection means may be used. Thus, any element enabling conversion of the current in the oscillating circuit into a voltage for the phase demodulator (for example, a mere resistor or shunt) may be used instead of the intensity transformer.

Further, although the present invention has been described hereabove in relation with a terminal for demodulating the phase of the back modulation signal and a transponder intended for demodulating the amplitude of the remote supply carrier, it also applies to the inverse case in which a terminal performs an amplitude demodulation and a transponder performs a phase demodulation.

The present invention is applicable to, among other areas, readers (for example, access control terminals or porticoes, automatic dispensers, computer terminals, telephone terminals, televisions or satellite decoders, etc.) of contactless chip cards (for example, identification cards for access control, electronic purse cards, cards for storing information about the card holder, consumer fidelity cards, toll television cards, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of transmission between a terminal and a transponder, each including an oscillating circuit, a modulation means and a demodulation means, the method including steps of simultaneously performing an amplitude-modulated transmission of a signal transmitted from the terminal to the transponder and a transmission of a signal from the transponder to the terminal adapted to being submitted to a phase demodulation in the terminal, and wherein an amplitude modulation ratio is smaller than 100%, the method further comprising regulating a signal phase in the oscillating circuit of the terminal with respect to a reference value, a response time of phase regulation being shorter than an amplitude modulation period and longer than a period of a signal that will have to undergo a phase demodulation.

2. The method of claim 1, further including a step of, on a terminal side, clipping a received signal before demodulation.

3. The method of claim 1, wherein the amplitude modulation ratio is smaller than 50%.

4. The method of claim 3, including, on the terminal side, clipping a reference signal of the phase demodulation.

5. A terminal for implementing a method of transmission between the terminal and a transponder, each including an oscillating circuit, a modulation means and a demodulation means, the method including steps of simultaneously performing an amplitude-modulated transmission of a signal transmitted from the terminal to the transponder and a transmission of a signal from the transponder to the terminal adapted to being submitted to a phase demodulation in the terminal, and wherein an amplitude modulation ratio is smaller than 100%, the terminal including:

means for comparing transmitted and received signals clipped by respective clipping means; and means for regulating a signal phase in the oscillating circuit of the terminal with respect to a reference value, a response time of phase regulation being shorter than an amplitude modulation period and longer than a period of a signal that will have to undergo a phase demodulation.

6. A transponder for implementing a method of transmission between a terminal and the transponder, each including an oscillating circuit, a modulation means and a demodulation means, the method including steps of simultaneously performing an amplitude-modulated transmission of a signal transmitted from the terminal to the transponder and a transmission of a signal from the transponder to the terminal adapted to being submitted to a phase demodulation in the terminal, and wherein an amplitude modulation ratio is smaller than 100%, the transponder including an amplitude demodulation means sized according to attenuation introduced by a back modulation means.

7. A transponder for implementing a method of transmission between a terminal and the transponder, each including an oscillating circuit, a modulation means and a demodulation means, the method including steps of simultaneously performing an amplitude-modulated transmission of a signal transmitted from the terminal to the transponder and a transmission of a signal from the transponder to the terminal adapted to being submitted to a phase demodulation in the terminal, and wherein an amplitude modulation ratio is smaller than 100%, the transponder including an amplitude demodulation means, a result of which is only taken into account during one state out of two of an output signal of a back modulation means.

* * * * *